United States Patent [19]

Nicholson

[11] Patent Number: 5,619,332

[45] Date of Patent: Apr. 8, 1997

[54] HIGH SPECTRAL RESOLUTION FIBER OPTIC SPECTROMETER

[75] Inventor: James E. Nicholson, Austin, Tex.

[73] Assignee: Tracor, Inc., Austin, Tex.

[21] Appl. No.: 440,637

[22] Filed: May 15, 1995

[51] Int. Cl.⁶ ............................................. G01J 3/51
[52] U.S. Cl. ................... 356/419; 250/226; 250/227.12
[58] Field of Search ........................... 356/218, 225, 356/226, 416, 419; 250/226, 227.12, 227.23

[56] References Cited

U.S. PATENT DOCUMENTS

| | | | |
|---|---|---|---|
| 3,953,127 | 4/1976 | Ahlquist et al. | |
| 4,296,319 | 10/1981 | Franks et al. | 250/227.12 |
| 4,299,488 | 11/1981 | Tomlinson | 356/328 |
| 4,625,108 | 11/1986 | Nestel et al. | 250/226 |
| 4,627,008 | 12/1986 | Rosenthal | 364/550 |
| 4,671,604 | 6/1987 | Soref | 359/161 |
| 4,674,874 | 6/1987 | Halldorsson et al. | 356/141.1 |
| 4,825,063 | 4/1989 | Halldorsson et al. | 250/227.12 |
| 4,850,693 | 7/1989 | Deason et al. | 356/35.5 |
| 4,856,899 | 8/1989 | Iwaoka et al. | 356/346 |
| 5,134,302 | 7/1992 | Rosenthal | 250/504 |
| 5,223,916 | 6/1993 | Muraoka | 356/402 |
| 5,225,894 | 7/1993 | Nicholson et al. | 356/419 |
| 5,231,521 | 7/1993 | Johnson et al. | 359/93 |
| 5,303,165 | 4/1994 | Ganz et al. | 364/571.01 |
| 5,305,233 | 4/1994 | Kawagoe et al. | 364/526 |
| 5,324,979 | 6/1994 | Rosenthal | 250/504 R |
| 5,340,979 | 8/1994 | Baney et al. | 250/214 B |
| 5,416,578 | 5/1995 | Ohki et al. | 250/227.23 |

FOREIGN PATENT DOCUMENTS

| | | |
|---|---|---|
| 3231025 | 2/1984 | Germany. |
| 3525518 | 7/1986 | Germany. |
| 63-222232 | 9/1988 | Japan ................... 250/227.23 |

*Primary Examiner*—F. L. Evans
*Attorney, Agent, or Firm*—Liddell, Sapp, Zivley, Hill & LaBoon, L.L.P.

[57] ABSTRACT

An incident optical signal is captured by an array of apertures and directed to pairs of fibers, each pair having a delay fiber with a unique length and a no-delay fiber. Each pair of fibers further has a unique transmission characteristic. Time interpolation is then performed using the transmission characteristic curve for each delay fiber and the duration from the time the optical signal arrives over the no-delay fibers and the time the signal arrives over the delay fibers to determine the wavelength. In a second embodiment, each pair of delay and no-delay fibers is replaced by a fiber splitter which directs light into a no-delay fiber and a delay fiber that have been split from the input of the splitter. In a third embodiment, two fiber splitters are used in place of the pairs of fibers. Each splitter has a number of branches for receiving light and an output end for guiding light onto the photodetectors. The propagation time of the delay optical signal, as compared against the no-delay signal, and other factors such as the length of the individual fiber and the transmission characteristics, are used to determine the wavelength.

27 Claims, 2 Drawing Sheets

HIGH SPECTRAL RESOLUTION FIBER OPTIC SPECTROMETER

BACKGROUND OF THE INVENTION

1. Field of the Invention

The invention relates in general to a system for identifying an optical signal and more particularly, to a system for determining the wavelength of an optical signal.

2. Description of the Related Art

The emergence of the laser as a potent source of controllable optical energy has made the rapid and accurate determination of the wavelength of the optical source a necessity in many military and commercial applications. For instance, in certain electronic warfare applications, the jamming of enemy optical return signals beamed at a particular target requires the accurate and quick identification of the enemy's incoming signal so that a jamming signal having the same wavelength can be scattered back to confuse the enemy's weapon guidance systems. In some communication applications, the quick and accurate identification of particular optical wavelengths is important in high density optical wideband networks which need to closely control the wavelength or frequency of the transmitted signals. A rapid determination of wavelength is also needed in a communications network in which a number of sets of remote sources of radiation are synchronized to a central set of reference optical sources. Other applications that require quick and accurate identification of the wavelength of an optical signal include the spectral line identification of laser outputs and the monitoring of stimulated emissions from a process or material for quality control purposes.

Traditionally, the determination of the wavelength component of an incident optical signal is performed using narrow band filters. However, the resolution of prior spectral discrimination systems depends on the width of the filter bandpass regions. For instance, an increase in resolution of spectral discrimination requires that the bandpass regions for each filter be narrow, resulting in an increase in the number of filters in order to analyze the same wavelength spectrum. Thus, the traditional technique requires a large number of narrow band filters to cover every possible wavelength of the incoming signal transmitter.

U.S. Pat. No. 5,225,894, issued on Jul. 6, 1993 to Nicholson, et al., hereby incorporated by reference, proposes a system for determining wavelengths using a limited number of broadband filters with overlapping bandpass regions to cover the wavelength spectrum of interest, but not with the resolution of a large number of narrowband filters. As asserted in the Nicholson patent, an array of apertures capture incident optical pulses and transport them either to broadband filters or directly to a photodetector. The output from the filters are then connected to optical delay lines before being directed to a photodetector, while the outputs from certain fibers (non-delay fibers) are connected directly to another photodetector. The time difference between when a signal arrives over optical delay lines from the filters and when a signal arrives over optical lines directly from the apertures are then reconverted mathematically into wavelength information.

It is desirable to eliminate the use of broadband filters to minimize the size, weight, and cost of the spectrometer. Further, the passing of an optical signal through the filters before going to the photodetector may cause the signal to be attenuated differently than the signal transported directly to the photodetector, as the filters are not made from the same material as the fibers that conduct the optical signal. Thus, certain compensation has to be made in the control electronics to handle the differential dynamic range of the delayed signal and the non-delayed signal. Thus, it is desirable that discrete filters be eliminated.

SUMMARY OF THE INVENTION

The present invention accurately resolves the wavelength of an optical signal without using any discrete broadband filters. In place of filters, a plurality of delay fibers having unique length and unique spectral transmission characteristics are used.

In one embodiment of the invention, a fiber splitter having M inputs and one output is used. Each of the individual inputs have been tapered in a manner to control the spectral transmission characteristics. Associated with each of the M inputs is a unique length of fiber. Because the resolution as well as the wavelength region of interest are related to the fiber composition and delay length, the delay fiber with a unique length can also perform the functions of the filter. The measured signal is unique and directly related to the wavelength of the source.

The delayed version and the non-delayed version of the optical signal are then combined and analyzed. In this process, photons exiting the fibers are directed at the start and stop photodetectors. The wavelength value is directly related to the resulting time difference, or duration, between the excitation of the two photodetectors. In this embodiment, the composite shape of the pulse received by the detector in an RLC circuit affects the time difference. The measured time difference is the weighted average of the transmission at each time delay. Time interpolation is performed through the selection of the combination of fiber transmission characteristics and fiber length. Finally, the time delay and the transmission characteristic curve for each delay fiber is used to determine the wavelength.

In addition to using a fiber splitter to determine the wavelength, the optical signal can also be resolved using a plurality of different delay fibers, each with unique spectral transmission characteristics and unique length. In this embodiment, one end of each fiber is coupled to an aperture, while the other end of the fiber terminates at a photodetector.

The present invention minimizes potential optical dynamic range differences as the direct and delayed signals are passed through fibers of the same composition. Since both channels pass through the same material, the magnitude of the signals passing through both channels is attenuated by the same amount. Thus, no compensation is necessary in the control electronics.

As described, the broadband filters have been completely eliminated from the spectrometer while maintaining the ability to resolve the wavelength of a signal without knowing specifically the particular wavelength range of the optical signal for purposes of obtaining fibers whose transmission characteristics match the correct bandpass regions.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
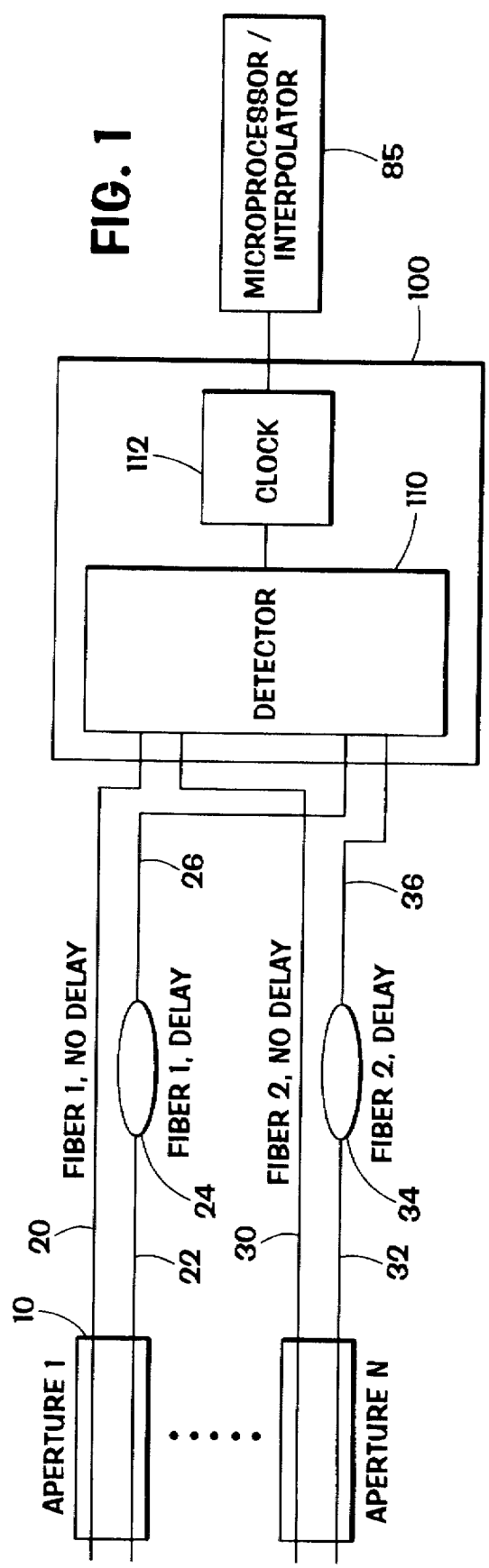
FIG. 1 is a schematic illustration of one embodiment of the present invention.

Turning now to the drawings, FIG. 1 is a schematic illustration of the first embodiment of the present invention. In FIG. 1, incident optical pulses are captured through a plurality of broadband apertures 10. Once captured by apertures 10, the optical signal is delivered to a pair of fibers: a no-delay fiber 20 and a delay fiber 22. In this embodiment, the fiber composition is identical for the pair of fibers 20 and 22. The delay fiber is a long fiber which causes a propagation delay because the optical signal has to travel a longer path. The remaining apertures are similarly constructed. However, each pair of fibers in the plurality of apertures 10 utilizes a different composition to generate a different spectral response. Further, the length of each delay fiber differs from that of any other delay fiber, while the length of the no-delay fibers is identical. As shown in FIG. 1, fiber pair comprising fibers 20 and 22 are made up of the same composition while another pair with fibers 30 and 32 are made up of another composition. Further, fibers 20 and 30 are of the same length, while fibers 22 and 32 have uniquely different lengths from any other fibers. In this manner, wavelength is mapped into a time-delay, enabling further wavelength resolution beyond the filtering range of the fibers. The optical signal exiting from the delay and no-delay fibers is then clocked by a timer 100 for measuring the time difference between the no-delay and delay signals. The output of timer 100 is delivered to an interpolator 85 which computes time interpolation through the selection of the combination of delay fiber transmission characteristics and delay fiber length. Thus, interpolator 85 can determine the wavelength with a high degree of resolution.

Figure 2:
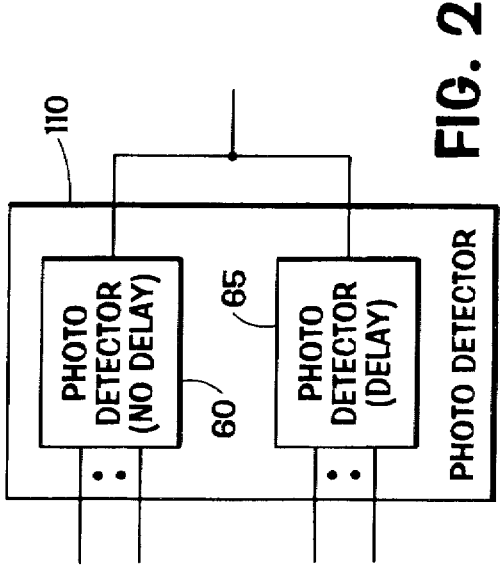
FIG. 2 is a schematic illustration of the detector of the first embodiment of the present invention.

Referring now to FIG. 2 in view of FIG. 1, the timer 100 is illustrated in more detail. In FIG. 2, a detector 110 receives optical pulses from fibers 20, 26, 30 and 36. The no-delay fibers 20 and 30 are collected together and the end-points of fibers 20 and 30 are directed at a first photodetector 60, referred to as the start photodetector. Similarly, the delay fibers 22 and 32 are collected together and the end-points of fibers 22 and 32 are directed at a second photodetector 65, referred to as the stop photodetector. To enable the mathematical reconversion of time into wavelength, the optical signal is received by the start photodetector 60 and the stop photodetector 65 is converted into an electrical signal and fed to a parallel resistance, inductance and capacitance (RLC) circuit 70 of FIG. 3. The clock circuit starts the time conversion process when the photons from the optical pulse exiting the no-delay fibers impinge upon the photodetector 60. The photodetector 60 is excited by the photons and generates a current impulse which is essentially leaked into the RLC circuit 70 of FIG. 3.

Figure 3:
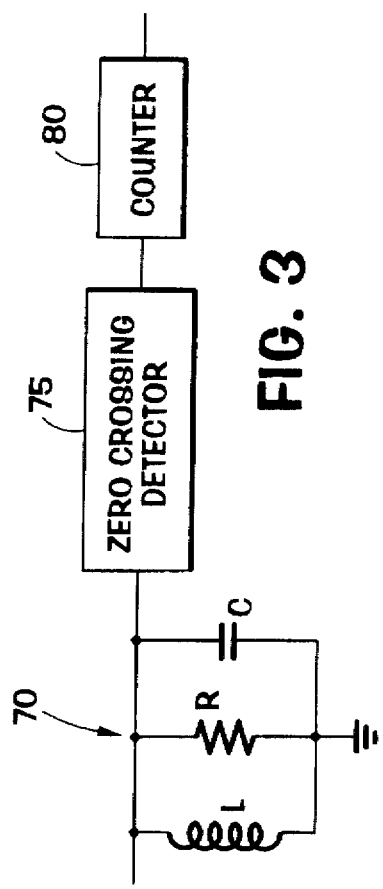
FIG. 3 is a schematic illustration of the clock of the first embodiment of the present invention.

FIG. 3 illustrates the clock circuitry in greater detail. The voltage build-up on the RLC circuit depends on the amount of photons hitting the RLC circuit 70. The current flow depends on the frequency of the pulses and the strength of the pulses that impinge on the photodetector 60. The charge build-up on the RLC circuit 70 causes it to ring cyclically with a sinusoidal voltage which rapidly decays in a manner similar to that of an overdamped oscillator. As the charge builds up from the photons hitting the photodetector, the period of the oscillator has unique shape, or ringing, and is related to the composition and strength of the light pulses being captured. The sinusoidal signal of the parallel RLC circuit 70 is then delivered to a zero crossing detector 75 which produces a signal to trigger counter 80 to begin counting.

When the optical signal from the delay fibers reaches the stop photodetector, another current impulse is generated, causing the RLC circuit 70 to generate a second sinusoidal voltage. The sinusoidal signal of the parallel RLC circuit 70 is again fed to the zero crossing detector 75 which produces signals causing the counter 80 to halt. The difference in time, as counted by counter 80 between when an optical signal is detected by the start photodetector 60 and the time when the optical signal is detected by the stop photodetector 65, is the time measurement which is converted into a wavelength value.

An interpolation scheme may now be used by the interpolator 85 of FIG. 1 to convert the length of time measured by the counter 80 into a wavelength value. The interpolation scheme for wavelength detection uses the time delay to refine the wavelength within the range of wavelengths received through the various fibers. In addition, the microprocessor based interpolator 85 also makes wavelength calculations based on the transmission curve characteristics of the compositions used in each fiber pair.

For a composite pulse, or a pulse composed of a broad spectrum of wavelengths, the interpolator 85 performs a weighted average of the time delays of light pulses traveling through various fibers to determine an average time delay. Because of the overlap of the transmission through fibers of different compositions, light of a given range of wavelengths may be transmitted through more than one fiber. The transmission is different for each fiber composition, depending upon the specific transmission coefficients of the fibers. The interpolator 85 calculates the weighted average time delay for a composite pulse using the following formula:

$$t_{average} = \frac{\Sigma t_i \cdot T_i}{\Sigma T_i}$$

where $t_{average}$=the weighted average time delay;

$t_i$=the time delay at an incremental wavelength of interest for a delay fiber in the plurality of delay fibers attached to a particular aperture in the plurality of apertures; and $T_i$=a percent transmission for the particular filter at the incremental wavelength of interest.

As is well known, an optical fiber generally consists of a core region where transmitted light is concentrated in a surrounding layer of a cladding material. In order to obtain optimum light transmission from one fiber to another, the core regions of the two fibers are placed in precision end-on alignment. However, if the alignment is off, a less than optimal transmission environment is encountered. In place of the use of fiber optic cables with different response characteristics, a fiber splitter can be used. Fiber splitters can be based on fused-tapered fibers, etched fibers, or other related fiber technologies. In a fused-tapered fiber splitter, the optical fibers are drawn to form a smaller cross-section portion. The smaller cross-section portions are fused together so that a light pulse propagating along the parent fiber is equally split into light pulses traveling in each fiber.

Alternatively, the fused-tapered splitter can be designed to tap off a fraction of the beam, thereby achieving the same light division.

The light division characteristic of a fiber splitter is particularly efficient when the ends of a plurality of fibers are fused and pulled in order to reduce the fiber diameter and to form a multi-fiber taper. In this approach, the fused fibers are scribed and broken at a location along the taper having the desired diameter. The resulting multi-fiber taper is secured between the apertures 10 and the detector 110 in such a manner as to provide maximum optical coupling.

The tapered shape of the fibers enhances the recovery into the core region of the light received into the cladding. This is due to the increasing diameter of the core as the distance from the electro-optical device increases. This magnification of optical power in the fiber cores results in a substantial reduction in the coupling loss from the electro-optical device to the plurality of optical fibers. The tapered shape of the fiber cores results in a magnifying effect since substantially all the light incident upon the multi-fiber bundle is ultimately directed to the fiber core regions. This is particularly effective when used in conjunction with graded index fibers, although the invention is not so limited and would be of substantial value when used in conjunction with step index fibers. A further benefit obtained by this approach is the elimination of coupling losses associated with the extra splice required in conventional arrangements. Still further, the balancing of optical power propagated in the various fibers is superior to that obtained in other arrangements.

Figure 4:
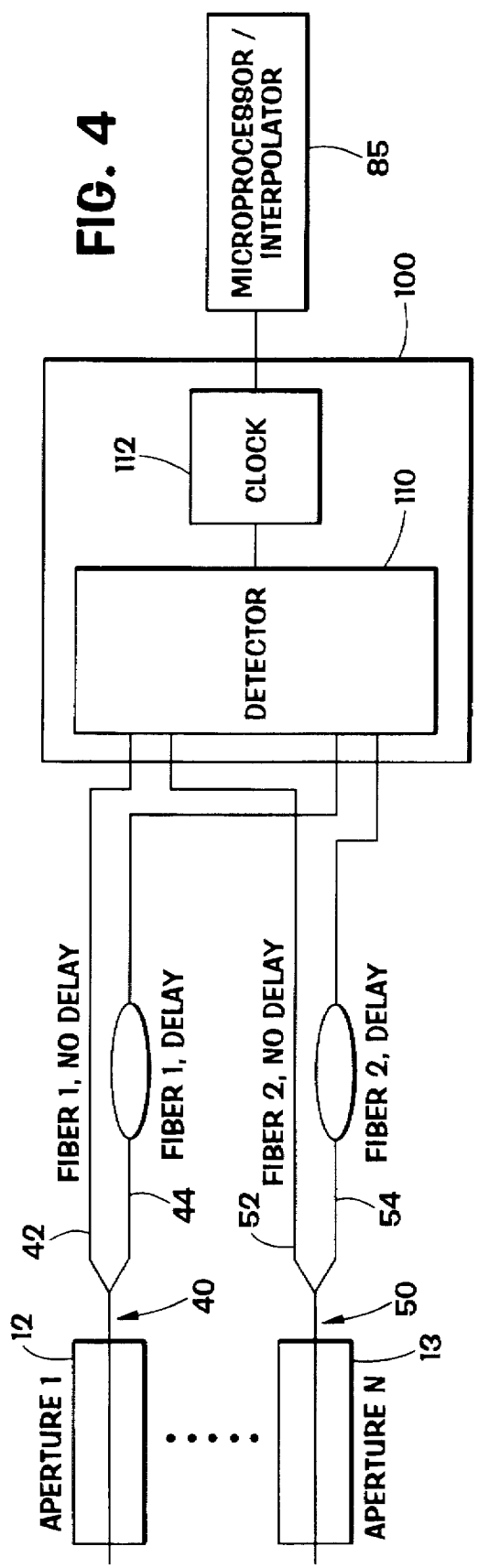
FIG. 4 is a schematic illustration of a second embodiment of the present invention.
Figure 5:
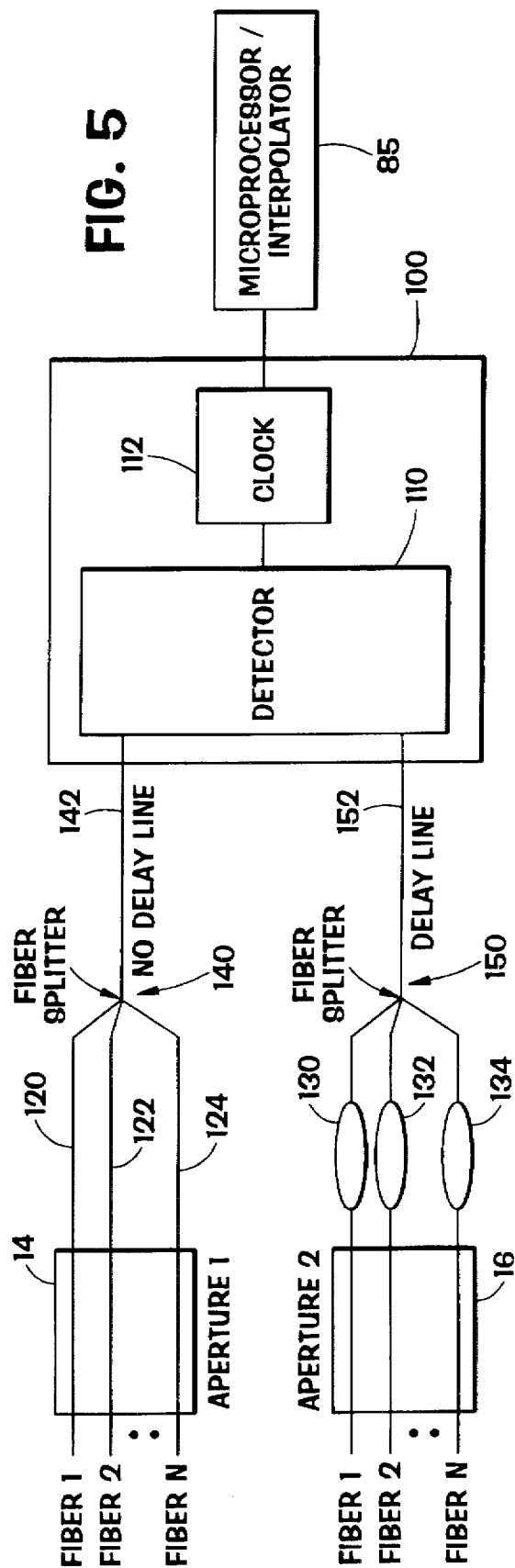
FIG. 5 is a schematic illustration of a third embodiment of the present invention.

In accordance with the foregoing, a second embodiment employs a plurality of fiber splitters coupled to the apertures. As shown in FIG. 4, fiber splitter 40 has an input end 12 to collect light, a no-delay segment 42, and a delay segment 44. Similarly, fiber splitter 50 has an input end 13 to collect light, a no-delay segment 52, and a delay segment 54. The delay segment 54 is of a length that is different than that of delay segment 44 and no-delay segments 42 and 52. Although it is not shown, it is understood that each input end of the splitter has a core and a cladding. Further, the fibers are connected together with their claddings adjacent each other and having a tapered region so that the core diameter in the tapered region is less than the core diameter in the untapered region, the tapered region having a generally planar end face, the fibers are positioned so that the light captured by the aperture 12 is transmitted directly to the segments 42 and 44 where it is transmitted inside the cores to the detector 110. In this embodiment, the fiber composition is the same for each channel comprising a particular delay and no-delay fiber. Further, the lengths for each delay fiber is different for each fiber, while the lengths for all no-delay fibers are identical. In addition, each channel has a unique spectral transmission characteristic to generate a different spectral response for each pair of delay and no-delay fibers.

In a third embodiment of the present invention, the spectrometer has a first aperture and a second aperture for capturing the wavelength spectrum of an optical signal. Only two sets of splitters 140 and 150 are needed.

In the third embodiment, a delay fiber splitter 150 having a delay output 152 and a set of delay split ends 130, 132, 134 is coupled to the first aperture 16. In this embodiment, each delay split end has unique spectral transmission characteristics and a unique length.

In addition, a no-delay fiber splitter 140 having a no-delay output 142 and a set of no-delay split ends 120, 122, 124 corresponding to each of delay split ends 130, 132, 134. In this embodiment, each of the no-delay split ends 120, 124, and 126 is coupled to the second aperture 16 with identical length and identical spectral transmission characteristics as its corresponding delay split ends 130, 132 and 134. In addition, the outputs 142 and 152 have the same spectral characteristics.

Although not shown, each of the split ends has a core and a cladding. The fiber split ends are connected together with their claddings adjacent each other and have a tapered region so that the core diameter in the tapered region is less than the core diameter in the untapered region. The tapered region has a generally planar end face and the fibers are positioned so that light from the aperture is transmitted directly to the fiber split ends where it impinges on the cores for transmission along the generally planar end face to the output of the splitter.

Although tapering the shape of the fibers in a splitter is particularly effective, the present invention can be used with traditional splicing techniques, such as scraping the cladding from the edges of the fibers which are to be adjacent one another. The core is then partially removed so that each fiber contributes a portion of the total core area. Further, the present invention can also be used with yet another splicing technique which removes the cladding from the end regions of the fibers being spliced. This approach provides a high ratio of core area to total cross section in the fiber bundle and permits a greater portion of the light incident on the fiber bundle to enter the light transmitting core regions. The use of individual fibers coupled together or one fiber splitter with a plurality of ends is thus equivalent and can be used interchangeably.

The foregoing disclosure and description of the invention are illustrative and explanatory thereof, and various changes in the size, shape, materials, components, circuit elements, wiring connections, and contacts, as well as in the details of the illustrated circuitry and construction and method of operation may be made without departing from the spirit of the invention.

I claim:

1. An apparatus for determining the wavelength of an optical signal received by an array of apertures, the apparatus comprising:

a) a plurality of fiber pairs coupled to the apertures, each pair forming a channel and having a delay fiber with a unique length and a no-delay fiber, the pair having a unique transmission characteristic;

b) a timer coupled to the plurality of channels to measure a duration from the time the optical signal exits the no-delay fiber and the time the optical signal exits the delay fiber; and c) an interpolator coupled to the output of the timer to convert the duration into a wavelength value.

2. The apparatus of claim 1, wherein each delay fiber has an incrementally increasing length.

3. The apparatus of claim 1, wherein the length of each no-delay fiber is the same.

4. The apparatus of claim 1, wherein the no-delay fiber has a different length than any of the delay fibers.

5. The apparatus of claim 1, wherein the timer further comprises:

a) a detector to produce a first electrical pulse when the optical signal exits the no-delay fiber and a second electrical pulse when the optical signal exits the delay fiber; and b) a clock coupled to the detector to measure the duration between the first and second electrical pulses.

6. The apparatus of claim 5, wherein the detector further comprises:

a) a first photodetector to receive the optical signal from the no-delay fiber and generate the first electrical pulse; and b) a second photodetector to receive the optical signal from the delay fiber and generate the second electrical pulse.

7. The apparatus of claim 5, wherein the clock further comprises:

a) an oscillator operable to produce a decaying oscillating signal upon receipt of each of the electrical pulses;

b) a zero-crossing detector coupled to the oscillator; and c) a counter coupled to the zero-crossing detector.

8. The apparatus of claim 7, wherein the oscillator comprises a parallel RLC circuit.

9. The apparatus of claim 7, wherein the zero-crossing detector comprises a pulse generator which is activated by the decaying oscillating signal.

10. The apparatus of claim 7, wherein the counter begins counting upon receipt of a first output from the zero-crossing detector and stops counting upon receipt of a second output from the zero-crossing detector.

11. The apparatus of claim 1, wherein the interpolator comprises a processor which converts the time difference into the wavelength value.

12. The apparatus of claim 11, wherein the processor converts the time difference into the wavelength value using a formula:

$$t_{average} = \frac{\Sigma t_i \cdot T_i}{\Sigma T_i}$$

where $t_{average}$=the weighted average time delay;

$t_i$=the time delay at an incremental wavelength of interest for a delay fiber in the plurality of delay fibers attached to a particular aperture in the plurality of apertures; and $T_i$=a percent transmission for the particular fiber at the incremental wavelength of interest.

13. An apparatus for determining the wavelength of an optical signal received by an array of apertures, the apparatus comprising:

a) a plurality of fiber splitters, each splitter having an input end coupled to the apertures and an output pair of fibers with a delay fiber with a unique length and a no-delay fiber, the pair having a unique transmission characteristic;

b) a timer coupled to the splitters to measure a duration from the time the optical signal exits the no-delay fiber and the time the optical signal exits the delay fiber; and c) an interpolator coupled to the output of the timer to convert the duration into a wavelength value.

14. The apparatus of claim 13, wherein each splitter has a tapered region.

15. An apparatus for determining the wavelength spectrum of an optical signal captured by a first aperture and a second aperture, the apparatus comprising:

a) a delay fiber splitter having a delay output and a set of delay split ends coupled to the first aperture, each delay split end having a unique spectral transmission characteristic and a unique length;

b) a no-delay fiber splitter having a no-delay output and a set of no-delay split ends corresponding to the delay split ends, each split end being coupled to the second aperture and having the same length and spectral transmission characteristic as each corresponding delay split end;

c) a timer coupled to the outputs of the no-delay splitter and the delay splitter to measure a duration between the optical signal exiting the no-delay fiber and the optical signal exiting the delay fiber; and d) an interpolator coupled to the output of the timer, the interpolator converting the duration into a wavelength value.

16. The apparatus of claim 15, wherein each delay split end has an incrementally increasing length.

17. The apparatus of claim 15, wherein each fiber splitter has a tapered region.

18. A method for determining the wavelength of an optical signal captured by an array of apertures, the method comprising the steps of:

a) delivering the optical signal into a plurality of fiber pairs, each pair having unique spectral transmission characteristics and further having a delay fiber and a no-delay fiber, the delay fiber having a unique length;

b) measuring a duration from the time the optical signal exits the no-delay fibers to the time the optical signal exits the delay fibers; and c) converting the duration into wavelength value.

19. The method of claim 18, wherein the delivering step a) further comprises the step of imposing a time delay on the signal transmitted through the delay fiber, the delay being dependent upon the wavelength of the optical signals.

20. The method of claim 18, wherein the measuring step b) further comprises the steps of:

1) generating a first electrical pulse to activate a counter to begin counting;

2) generating a second electrical pulse to halt the counter from counting; and 3) computing the duration between the first electrical pulse and the second electrical pulse.

21. The method of claim 18, wherein the converting step c) applies a formula:

$$t_{average} = \frac{\Sigma t_i \cdot T_i}{\Sigma T_i}$$

where $t_{average}$=the weighted average time delay;

$t_i$=the time delay at an incremental wavelength of interest for a delay fiber in the plurality of delay fibers attached to a particular aperture in the plurality of apertures; and $T_i$=a percent transmission for the particular fiber at the incremental wavelength of interest.

22. A method for determining the wavelength of an optical signal captured by an array of apertures, the method comprising the steps of:

a) splitting in a fiber splitter the optical signal into first signals and second signals;

b) delaying the first signals;

c) measuring a duration between the exit of the second signals and the first signals from the fiber splitter; and d) converting the duration into wavelength value.

23. The method of claim 22, wherein the measuring step c) further comprises the steps of:

1) generating a first electrical pulse to activate a counter to begin counting;

2) generating a second electrical pulse to halt the counter from counting; and 3) computing the duration between the first electrical pulse and the second electrical pulse.

24. The method of claim 22, wherein the converting step d) applies a formula:

$$t_{average} = \frac{\Sigma t_i \cdot T_i}{\Sigma T_i}$$

where $t_{average}$=the weighted average time delay;

$t_i$=the time delay at an incremental wavelength of interest for a delay fiber in a plurality of delay fibers attached to a particular aperture in the plurality of apertures; and $T_i$=a percent transmission for the particular fiber at the incremental wavelength of interest.

25. A method for determining the wavelength of an optical signal captured by a delay aperture and a no-delay aperture, the method comprising the steps of:

a) delivering the optical signal captured by the delay aperture into split ends of a delay fiber splitter and the optical signal captured by the no-delay aperture into corresponding split ends of a no-delay fiber splitter, each split end of the delay splitter having a unique spectral transmission characteristic and a unique length, each corresponding split end of the no-delay splitter having the same spectral transmission characteristic as the corresponding delay split end;

b) measuring a duration from the time the optical signal exits the output of the no-delay fiber splitter to the time the optical signal exits the output of the delay fiber splitter; and c) converting the duration into wavelength value.

26. The method of claim 25, wherein the measuring step b) further comprises the steps of:

1) generating a first electrical pulse to activate a counter to begin counting;

2) generating a second electrical pulse to halt the counter from counting; and 3) computing the duration between the first electrical pulse and the second electrical pulse.

27. The method of claim 25, wherein the converting step c) applies a formula:

$$t_{average} = \frac{\Sigma t_i \cdot T_i}{\Sigma T_i}$$

where $t_{average}$=the weighted average time delay;

$t_i$=the time delay at an incremental wavelength of interest for a delay fiber in a plurality of delay fibers attached to a particular aperture in the plurality of apertures; and $T_i$=a percent transmission for the particular fiber at the incremental wavelength of interest.

* * * * *